United States Patent [19]

Markland

[11] 4,047,912
[45] Sept. 13, 1977

[54] TURBOCHARGER AND AIR CLEANER DEVICE

[75] Inventor: R. Donald Markland, Menlo Park, Calif.

[73] Assignee: Consolidated Freightways, Inc., San Francisco, Calif.

[21] Appl. No.: 695,070

[22] Filed: June 11, 1976

[51] Int. Cl.² ............................................. B01D 45/00
[52] U.S. Cl. ...................................... 55/406; 55/454; 55/461; 55/467; 123/119 C
[58] Field of Search ................ 55/406, 394, 454, 460, 55/461, 466, 467, 470, 471–473; 123/119 C; 415/145, 144

[56] References Cited

U.S. PATENT DOCUMENTS

| | | | |
|---|---|---|---|
| 1,675,200 | 6/1928 | Smith | 210/416 R |
| 3,450,333 | 6/1969 | Nihot et al. | 55/461 |
| 3,641,744 | 2/1972 | Culbert et al. | 55/466 |
| 3,884,658 | 5/1975 | Roach | 123/119 C |

FOREIGN PATENT DOCUMENTS

| | | | |
|---|---|---|---|
| 1,513,045 | 1/1968 | France | 415/145 |
| 377,353 | 7/1932 | United Kingdom | 210/512 |

Primary Examiner—Bernard Nozick
Attorney, Agent, or Firm—Flehr, Hohbach, Test, Albritton & Herbert

[57] ABSTRACT

A turbocharger and intake air cleaning device for use with internal combustion engines. A collection spout is mounted tangent to the volute of the diffuser housing at a position from the turbocharger's discharge port which is upstream relative to the direction of rotation of air within the housing. A nozzle is mounted in the distal end of the collection spout. Dirt and other foreign matter carried in the rotating air stream migrates by centrifugal action into the collection spout where it is separated from compressed air flowing through the discharge port. An opening in the nozzle expels the foreign matter while at the same time limiting air leakage so as to maintain boost pressure within the diffuser.

5 Claims, 4 Drawing Figures

TURBOCHARGER AND AIR CLEANER DEVICE

BACKGROUND OF THE INVENTION

This invention relates to devices for cleaning the intake air of internal combustion engines, and in particular is for use with such engines which are equipped with turbochargers.

It is conventional for engines used with trucks or other vehicles to employ turbochargers for compressing intake air, and an air cleaner is connected with the intake of the turbocharger. Typically such air cleaners are either of the oil bath or paper element type. The oil bath type cleaner must be serviced regularly by cleaning the elements and replacing the oil, and if this service is not performed periodically dirt will build up on the elements and eventually the pressure restriction will cause oil to be carried over into the turbocharger and engine. The paper type cleaner must also be periodically serviced by replacing the paper element. If this service is not performed on a regular basis dirt will gradually build up on the element to the point where the air flow restriction will cause a loss of engine power. Moreover, either type of cleaner creates an objectionable pressure restriction which can be as much as one inch Hg at full engine speed and power.

Cyclone type separators have also been used to separate small solid particles from gases. Air cleaners of the cyclone type have previously been used with diesel engines, but have not been satisfactory because they are quite expensive and also cause an objectionable pressure drop at the compressor inlet.

OBJECTS AND SUMMARY OF THE INVENTION

It is a general object of the invention to provide an improved device of simplified and inexpensive design to clean the inlet air for an internal combustion engine, particularly for an engine which is equipped with a turbocharger.

Another object is to provide a turbocharger and air cleaner device which is self-cleaning such that the need for periodic servicing is eliminated.

Another object is to provide a unitary turbocharger and air cleaner device of the type described which eliminates the requirement for equipping an engine with a separate air cleaner.

Another object is to provide a turbocharger and air cleaner device of the type described which separates dirt and other foreign matter from compressed air within the diffuser housing of a turbocharger and which automatically expels such foreign matter from the housing.

The invention in summary includes a turbocharger having a volute-shaped diffuser housing formed with a discharge port for directing a stream of pressurized air into the intake manifold of an engine. A collection spout is mounted tangent to the diffuser housing and extends outwardly in the direction of rotation of air within the housing. Foreign matter carried by the rotating air stream migrates outwardly by centrifugal action so that it is collected in the spout and separated from the air stream flowing to the engine. A nozzle mounted in the distal end of the spout is formed with an opening which is sized to expel the foreign matter while limiting air leakage so as to maintain pressure within the diffuser.

The foregoing and additional objects and features of the invention will become apparent from the following description in which the preferred embodiments have been set forth in detail in conjunction with the accompanying drawings.

DESCRIPTION OF THE PREFERRED EMBODIMENTS

Figure 1:
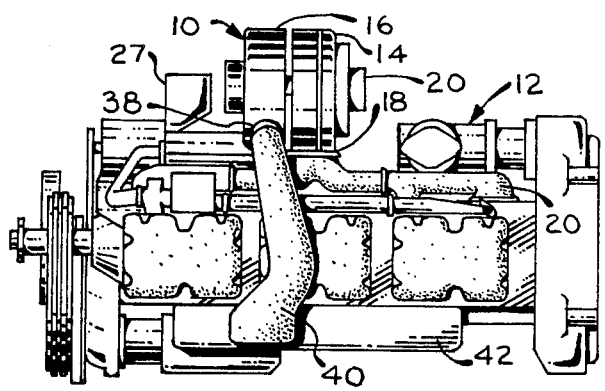
FIG. 1 is a top plan view of an internal combustion engine provided with the turbocharger and air cleaner device of the invention.

In the drawings FIG. 1 illustrates generally at 10 a preferred embodiment of the turbocharger and air cleaner device shown mounted for use with a typical internal combustion engine 12 of diesel design. Device 10 comprises a turbine housing 14 and compressor housing 16 which respectively enclose a suitable turbine wheel, not shown, and impeller wheel 17 which are mounted for conjoint rotation on a common shaft. An inlet port 18 formed in the side of the turbine housing is connected with the engine's exhaust manifold 20 for receiving the exhaust gases which drive the turbine wheel. An outlet port formed on the end of the turbine housing directs the exhaust gases to a suitable muffler and tail pipe, not shown.

Figure 2:
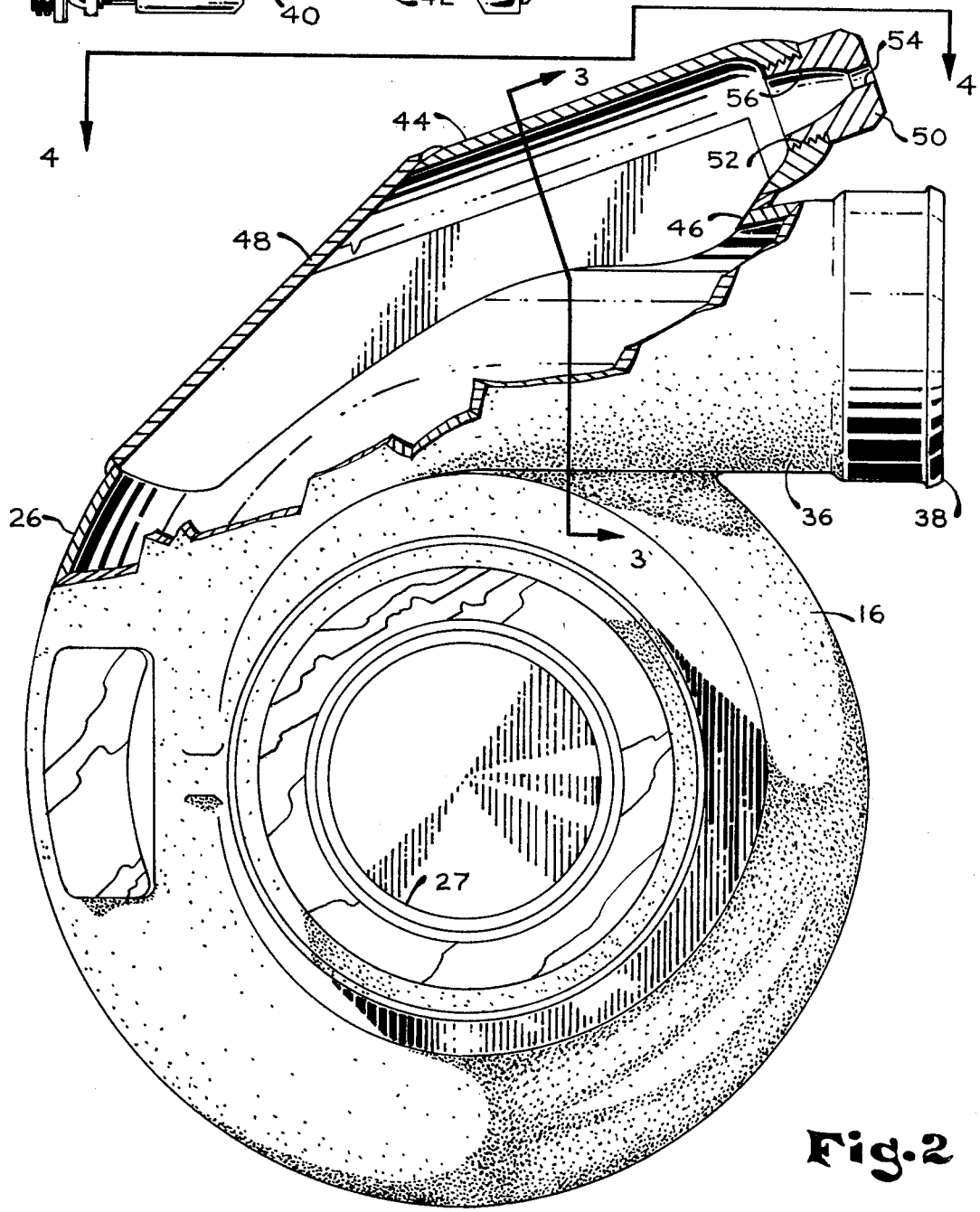
FIG. 2 is a partially cut-away side elevational view of the turbocharger and air cleaner device of FIG. 1.
Figure 4:
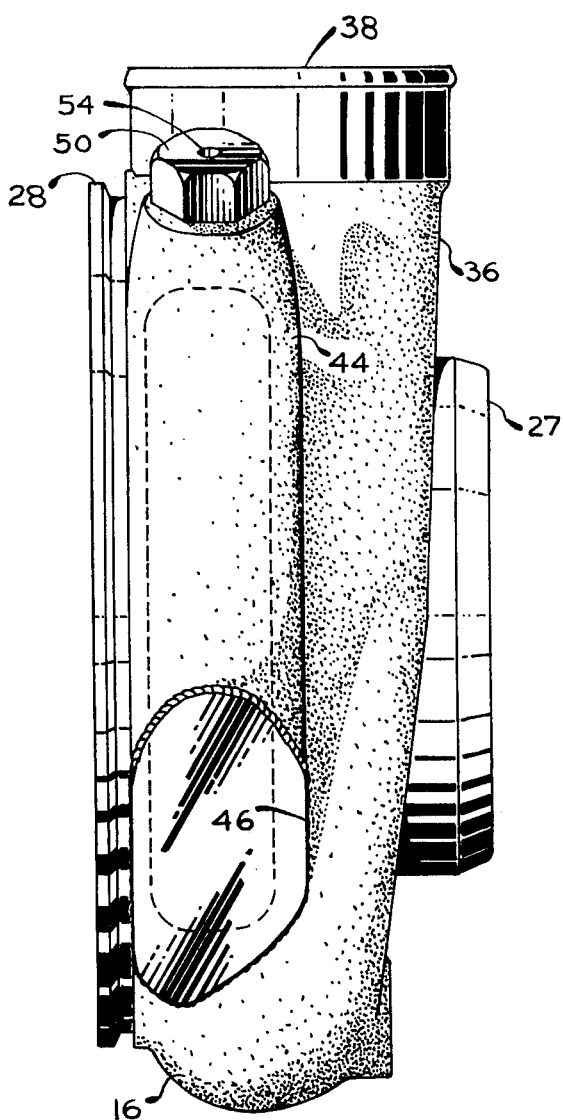
FIG. 4 is an end view taken along the lines 4—4 of FIG. 2.
Figure 3:
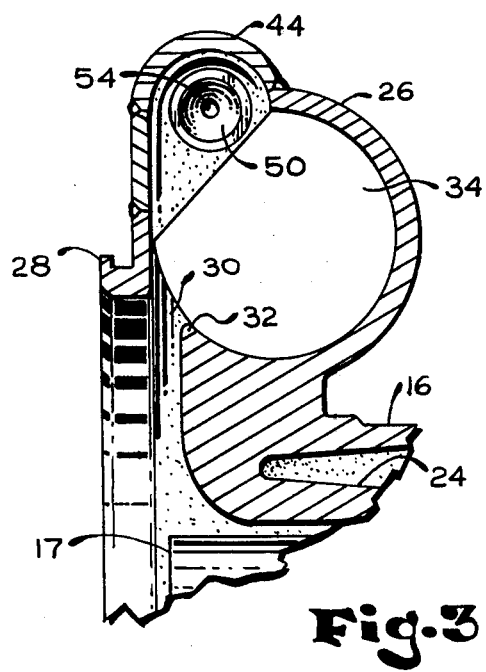
FIG. 3 is a fragmentary cross-section taken along the line 3—3 of FIG. 2.

Compressor housing 16 is illustrated in detail in FIGS. 2–4 and includes a circular shell 24 which encloses the impeller wheel together with a volute-shaped diffuser housing 26. An intake port 27 is provided at the outer end of the diffuser housing for directing atmospheric air to the impeller wheel. An annular mounting flange 28 formed at the end of the diffuser housing is detachably mounted to a similar flange on the turbine housing by a suitable Marmon-type clamp, not shown. The annular space 30 formed between flange 28 and the inner lip 32 of the diffuser forms a passage for directing the rotating stream of air from the turbine wheel into the diffuser volume 34 where the velocity head of the air is converted into pressure head. The diffuser housing terminates with a tubular shell 36 the distal end of which forms a circular discharge port 38. The longitudinal axis of this shell is oriented generally tangent with the diffuser housing. Discharge port 38 is connected with a conduit 40 which in turn is connected with an intake manifold 42 on the engine.

A tubular collection spout 44 merges with an elongate opening 46 formed in a side of the diffuser housing which is upstream of the discharge port. A flat plate 48 is secured as by welding across the collection spout and diffuser housing to close off the lower end of opening 46. The longitudinal axis of spout 44 is oriented generally tangent with the diffuser housing and extends outwardly therefrom in the direction of rotation of air within the housing. Dirt and other foreign matter which is caused to migrate by centrifugal force along the inner circumference of the housing is thereby directed into the spout where it is collected and separated from the air stream flowing to the intake manifold.

A nozzle 50 is threadably mounted in an opening 52 formed in the distal end of the collection spout. A circular aperture 54 concentrically formed in the nozzle opens into a cup-shaped recess 56 provided on the inner side of the nozzle. Aperture 54 is sized with a diameter on the order of 0.250 inch which is sufficiently large to permit foreign matter to be expelled from the spout but which at the same time controls or limits leakage of air from the spout so as to maintain the boost pressure within the diffuser.

As best shown in FIG. 3 the longitudinal axis of collection spout 44 is disposed offset of the diffuser housing substantially in register with annular passage or space 30. Foreign matter carried by the rapidly rotating air stream entering the diffuser through this passageway is carried outwardly by centrifugal action substantially in a narrow band or plane which passes through the longitudinal axis of the collection spout. This facilitates the direct trapping and removal of the foreign matter by the spout.

In operation, the turbocharger and air cleaner device 10 is mounted on the engine as in FIG. 1 with intake port 27 directly open to the atmospher. With the engine in operation its exhaust gases drive the turbine wheel at high speed and this in turn drives the impeller. Air is drawn in through port 27 and forced outwardly by the impeller through passage 30 into diffuser housing 26 where its static pressure is increased. Dirt and foreign matter carried by the rotating air stream migrates by centrifugal action outwardly about the diffuser housing and follows a circumferential path into collection spout 44. The dirt and foreign matter is thereby trapped and separated from clean compressed air passing through port 38 to the intake manifold. The dirt and foreign matter is automatically expelled from the spout through nozzle aperture 54 without the requirement for periodic servicing.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. An air cleaner and turbocharger device comprising a turbocharger housing including an inlet and enclosing a rotary impeller, said housing being a volute-shaped diffuser into which air is compressed by the impeller, said diffuser having a tangential gas discharge port, means forming a collection spout extending outwardly from the periphery of the diffuser and the gas discharge port for trapping and collecting foreign matter carried in a stream of air rotating within the diffuser, and a nozzle mounted in the discharge end of the spout, said nozzle being formed with an opening sized larger than said foreign matter for expelling the collected foreign matter from the spout, said opening being sized substantially less than the diameter of the collection spout for restricting air leakage through the nozzle for minimizing pressure loss within the diffuser and thereby maintaining boost pressure in the discharge port of the diffuser.

2. A device as in claim 1 in which the opening means has a diameter on the order of 0.250 inch.

3. A device as in claim 1 which includes means forming an annular passage between the impeller and diffuser for directing the air into the latter, and the spout is disposed radially outwardly of the passage in the plane through which the foreign matter is carried by the rotating air whereby such foreign matter is directly trapped and collected by the spout.

4. A device as in claim 1 in which the longitudinal axis of the spout extends generally tangent with the diffuser.

5. A device as in claim 4 in which the diffuser includes a generally tubular air discharge shell formed with its longitudinal axis generally tangent with the periphery of the diffuser, with the shell forming the discharge port, and said spout merges with the shell on a side thereof upstream of the direction of rotation of said air stream within the diffuser.

* * * * *